United States Patent
Garden

(10) Patent No.: US 9,694,281 B2
(45) Date of Patent: Jul. 4, 2017

(54) DATA CENTER MANAGEMENT OF MULTIMODE SERVERS

(71) Applicant: MICROSOFT CORPORATION, Redmond, WA (US)

(72) Inventor: Euan Peter Garden, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 287 days.

(21) Appl. No.: 14/318,867

(22) Filed: Jun. 30, 2014

(65) Prior Publication Data
US 2015/0375112 A1    Dec. 31, 2015

(51) Int. Cl.
| | | |
|---|---|---|
| G06F 17/00 | (2006.01) | |
| A63F 13/355 | (2014.01) | |
| G06F 9/50 | (2006.01) | |
| H04N 21/478 | (2011.01) | |
| H04N 21/239 | (2011.01) | |
| H04N 21/24 | (2011.01) | |

(52) U.S. Cl.
CPC .......... *A63F 13/355* (2014.09); *G06F 9/5061* (2013.01); *H04N 21/2393* (2013.01); *H04N 21/2405* (2013.01); *H04N 21/2408* (2013.01); *H04N 21/4781* (2013.01); *A63F 2300/534* (2013.01)

(58) Field of Classification Search
USPC .............................................. 463/31–33, 42
See application file for complete search history.

(56) References Cited

U.S. PATENT DOCUMENTS

| | | | |
|---|---|---|---|
| 9,177,445 B2 * | 11/2015 | Vemuri | G07F 17/3267 |
| 2005/0267639 A1 | 12/2005 | Sharma et al. | |
| 2005/0278453 A1 | 12/2005 | Cherkasova | |
| 2007/0130341 A1 | 6/2007 | Ma | |
| 2007/0162624 A1 | 7/2007 | Tamasi et al. | |
| 2008/0254893 A1 * | 10/2008 | Patel | G07F 17/3276 |
| | | | 463/42 |
| 2009/0104987 A1 * | 4/2009 | Kelly | G07F 17/3286 |
| | | | 463/29 |
| 2010/0113162 A1 * | 5/2010 | Vemuri | G07F 17/3267 |
| | | | 463/42 |

(Continued)

FOREIGN PATENT DOCUMENTS

WO    2013077034 A1    5/2013

OTHER PUBLICATIONS

"International Search Report & Written Opinion Received for PCT Application No. PCT/US2015/038206", Mailed Date: Oct. 8, 2015, 11 Pages.

(Continued)

*Primary Examiner* — Ronald Laneau
(74) *Attorney, Agent, or Firm* — Shook, Hardy & Bacon L.L.P.

(57) ABSTRACT

Aspects of the present invention relate to a multimode gaming server that can run in game mode and video encode mode. Aspects of the invention can monitor demand for different computing projects in a data center and change the gaming servers into different modes to meet the demand. The arrangement of gaming servers in the different modes can be established to balance heat generation evenly throughout a data center.

20 Claims, 10 Drawing Sheets

(56) References Cited

U.S. PATENT DOCUMENTS

| | | |
|---|---|---|
| 2010/0166062 A1 | 7/2010 | Perlman et al. |
| 2010/0211810 A1 | 8/2010 | Zacho |
| 2010/0318818 A1 | 12/2010 | Mangione-Smith |
| 2011/0107220 A1 | 5/2011 | Perlman |
| 2012/0004039 A1 | 1/2012 | Perry et al. |
| 2012/0016528 A1 | 1/2012 | Raman et al. |
| 2012/0149464 A1 | 6/2012 | Bone et al. |
| 2012/0317568 A1 | 12/2012 | Aasheim |
| 2013/0054987 A1 | 2/2013 | Pfeiffer et al. |
| 2013/0094498 A1 | 4/2013 | Wittenschlaeger |
| 2013/0151869 A1 | 6/2013 | Steinman et al. |
| 2013/0159741 A1 | 6/2013 | Schluessler et al. |
| 2014/0126149 A1 | 5/2014 | Campbell et al. |
| 2014/0171190 A1 | 6/2014 | Diard |
| 2014/0286438 A1 | 9/2014 | Apte |
| 2014/0309039 A1 | 10/2014 | Yoshida et al. |
| 2015/0043905 A1* | 2/2015 | Graves ............... H04Q 11/0005 398/25 |

OTHER PUBLICATIONS

Enhance Data Center Utilization by 95%with Enterprise Scale Workload Management, Published Date: Apr. 13, 2011, in White Paper of Oracle, http://www.oracle.com/us/products/database/oracle-grid-engine-197282.pdf, 4 pages.

Paul Teich, Future of Data Center Processors: No Wimpy Cores?, published Date: Sep. 27, 2012, http://slashdot.org/topic/datacenter/future-of-data-center-processors-no-wimpy-cores/, 7 pages.

Gartner Says Efficient Data Center Design Can Lead to 300 Percent Capacity Growth in 60 Percent Less Space—Published Date: Nov. 18, 2011, http://www.gartner.com/newsroom/id/1472714, 2 pages.

Yuan Feng, et al., Bargaining Towards Maximized Resource Utilization in Video Streaming Datacenters, published Date: Mar. 25, 2012; 31st Annual IEEE International Conference on Computer Communications, http://ants.iis.sinica.edu.tw/3bkmj9ltewxtsrrvnoknfdxrm3zfwrr/24/%5BInfocom%202012%5DBargaining%20Towards%20Maximized%20Resource%20Utilization%20in%20Video%20Streaming%20Datacenters.pdf, 9 pages.

Douglas Hunt, Gaming Moves to the Cloud, published Date: Apr. 7, 2011, http://www2.alcatel-lucent.com/techzine/gaming-moves-to-the-cloud/, 3 pages.

Author: Ayan Banerjee, Tridib Mukherjee, Georgios Varsamopoulos, Sandeep K. S. Gupta, "Cooling-Aware and Thermal-Aware Workload Placement for Green HPC Data Centers"—Published Date: Aug. 15, 2010, Proceedings: In International Green Computing Conference; http://citeseerx.ist.psu.edu/viewdoc/download?doi=10.1.1.172.4069&rep=rep1&type=pdf, 12 pages.

"Data Center Efficiency: Save Energy, Save Money, Save Space—Published Date: Mar. 28, 2013, 3 pages: http://www.gawtechnology.net/blog/bid/279999/Data-Center-Efficiency-Save-Energy-Save-Money-Save-Space."

Non-Final Office Action dated Mar. 15, 2016 in U.S. Appl. No. 14/145,917, 21 pages.

"International Preliminary Report on Patentability Issued in PCT Application No. PCT/US2014/068352", Mailed Date: Jun. 24, 2016, 8 pages.

"Second Written Opinion Issued in PCT Application No. PCT/US2014/068352", Mailed Date: Nov. 25, 2015, 6 pages.

"Second Written Opinion Issued in PCT Application No. PCT/US2015/038206", Mailed Date: May 27, 2016, 8 Pages.

"International Preliminary Report on Patentability Issued in PCT Application No. PCT/US2015/038206", Mailed Date: Sep. 16, 2016, 9 Pages.

Final Office Action dated Sep. 26, 2016 in U.S. Appl. No. 14/145,915, 21 pages.

* cited by examiner

DATA CENTER MANAGEMENT OF MULTIMODE SERVERS

BACKGROUND

Generally, the servers selected for deployment in a data center can perform a wide range of computing tasks, but may not perform some specialized computing tasks very efficiently. For example, an enterprise server may be able to perform some video encoding through the central processing unit ("CPU"), but the work may be inefficient. On the other hand, a server designed for video work may perform general computing projects inefficiently.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In one aspect, a method of managing multimode gaming servers within a data center is provided. The method includes setting more than 50% of a plurality of multimode gaming servers in game mode, each multimode gaming server having a central processing unit ("CPU"), a graphics processing unit ("GPU"), and a video encoder. The method also includes monitoring demand for gaming in a data center unit comprising the plurality of multimode gaming servers. The method further includes determining, at the computing device, when demand for gaming falls below a threshold by analyzing a rate of requests for new game sessions. The method further includes, upon said determination, transitioning a subset of the plurality of multimode gaming servers from a game mode to a video render mode. The method also includes assigning a video render job to a multimode gaming server in the subset.

BRIEF DESCRIPTION OF THE DRAWINGS

Aspects of the invention are described in detail below with reference to the attached drawing figures, wherein.

DETAILED DESCRIPTION

Figure 1:
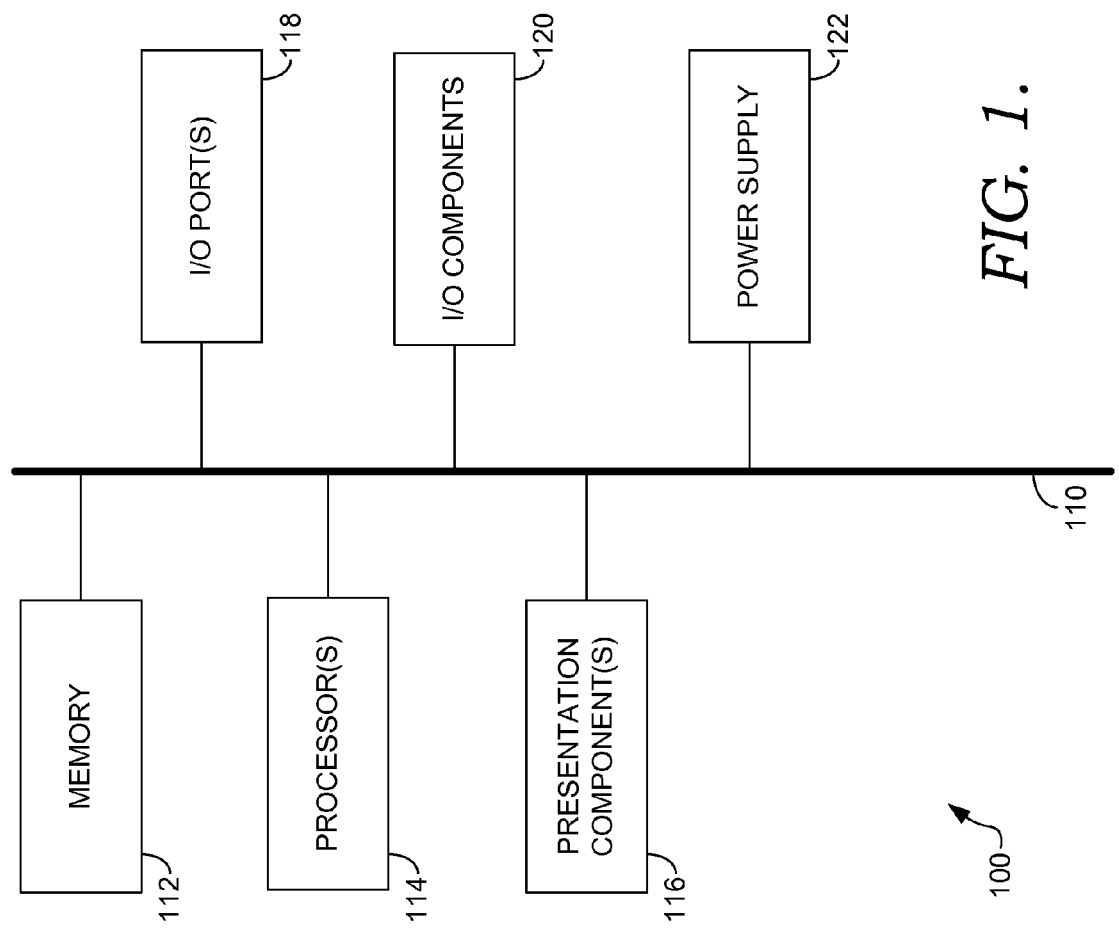
FIG. 1 is a block diagram of an exemplary computing environment suitable for implementing aspects of the invention.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention relate to management of a multimode gaming server (aka "gaming server" or "game server") that is able to operate in a game mode and a video encode mode. Generally, the data center controller can transition the gaming servers into game mode during peak demand for gaming and into video render mode during off-peak hours. In order to facilitate video rendering in off-peak hours, the data center may utilize a queue to accumulate video rendering jobs. The queue may prioritize the video rendering jobs to assign the most urgent projects to the first gaming servers that become available.

Aspects of the present invention monitor characteristics of gameplay to determine whether gaming servers should be transitioned to or out of game mode. Aspects of the invention may monitor game instances by game title. For example, aspects of the invention may forecast that demand for a specific game title within a data center is 400 game instances. In one aspect, a gaming server is preloaded with a single game title or only a few game titles. In this case, individual gaming servers may be transitioned out of game mode as demand wanes for the game or games the game server is set up to run.

As used herein, "gaming server" refers to a computing device comprising a CPU, GPU, and a hardware video encoder along with software that enables the gaming sever to execute a video game and produce a rendered video stream of the video game for communication to a client device. Thus, a general-purpose server would not be a "gaming server." Further, a server that does not produce a rendered video game image for the client is not a gaming server as used herein.

The gaming server comprises hardware and software for operation in a data center. Specifically, the gaming server is directed to perform various computing tasks by a data center controller, also described as a data center fabric. In one aspect, the gaming server has the same CPU and GPU as found in a commercially available video game console, such as Microsoft's Xbox 360, Sony's PlayStation® family, Xbox One, and Nintendo's Wii™ and such.

Aspects of the invention may manage the server modes based on cooling needs of individual servers and groups of servers within a data center. In one aspect, the heat produced by the gaming server differs in the two modes. Aspects of the present invention can change the mode of a gaming server to match with available cooling within a data center unit. For example, a fan wall may serve a group of servers within a rack.

As used herein, a "gaming optimized computing resource" is adapted to output a rendered video game image to a client device, such as a game console. The video game image may be rendered as a streaming video communicated to the client. In order to render a high quality video game image, a gaming optimized computing resource can have a graphics processing unit that is more powerful than a graphics processing unit, if any, found in a general-purpose computing resource. The gaming optimized computing resource may also have dedicated video encoding capabilities.

Power consumption can be used as a proxy for a processor's capabilities. In one aspect, a "gaming server" can be defined by the inclusion of a GPU that consumes greater than a threshold percentage of power used by the gaming server during peak power consumption. In one aspect, the threshold percentage of power is greater than 40% of peak power, for example greater than 50%, for example greater than 60%, for example greater than 70%, or for example greater than 80%. For example, a GPU in a gaming server could use 100 W, with a total peak power usage (e.g., GPU, CPU, and video encode) of 150 W in the gaming optimized computing resource.

Aspects of the present invention may transition various types of computing resources between different power modes or states. As used herein, the term "low-power mode" means a resource is presently operating at less than 20% of the resource's maximum rate of power. As an example, a resource in low-power mode may be shut off at the motherboard socket but able to respond to a power-on command.

As used herein, the phrase "active processing mode" means a computing resource is actively processing a computing workload. A computing resource in active processing mode can be using greater than 20% of the resource's maximum rate of power.

Having briefly described an overview of aspects of the invention, an exemplary operating environment suitable for use in implementing aspects of the invention is described below.

Exemplary Operating Environment

Referring to the drawings in general, and initially to FIG. 1 in particular, an exemplary operating environment for implementing aspects of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more aspects of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
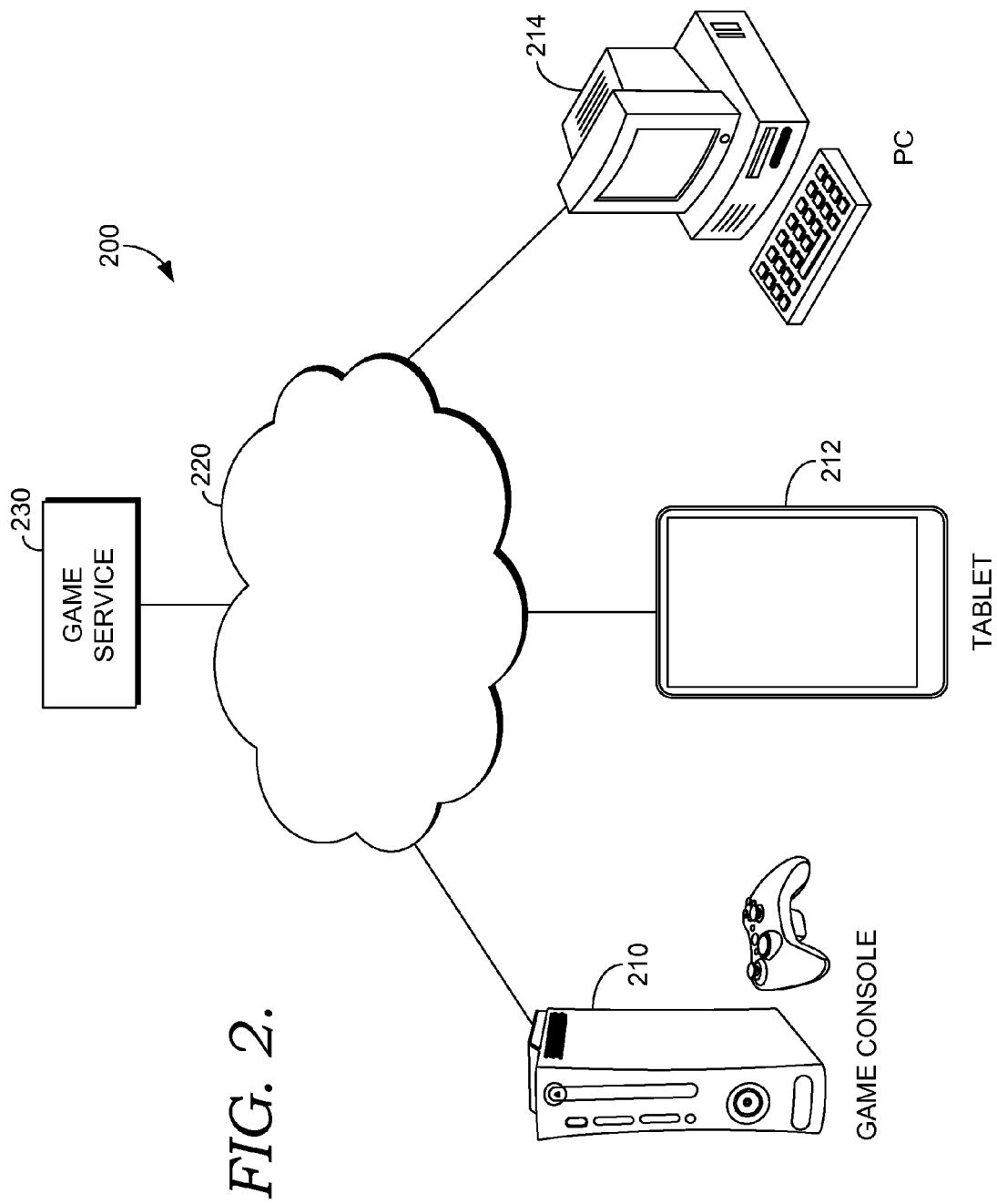
FIG. 2 is a diagram depicting a gaming environment, in accordance with an aspect of the present invention.

Turning now to FIG. 2, an online gaming environment 200 in which a multimode gaming servers may be deployed within a data center is shown, in accordance with an aspect of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one aspect, the tablet 212 may act as an input device for a game console 210 or a personal computer 214. In another aspect, the tablet 212 is a stand-alone game client. Network 220 may be a wide area network, such as the Internet.

Game service 230 comprises multiple computing devices communicatively coupled to each other. In one aspect, the game service 230 is implemented using one or more data centers that comprise multimode gaming servers. The data centers may be spread out across various geographic regions including cities throughout the world. In this scenario, the game clients may connect to the closest data centers. Aspects of the present invention are not limited to this setup.

The game service 230 allows the game to be executed within the computing devices provided by the game service 230. A communication session between the game service and game clients carries input traffic to the game service 230 and returns a rendered game image. In this aspect, a computing device that is part of the game service executes the video game code using a control stream generated by input devices associated with the various game clients. The rendered video game is then communicated over the network to the game client where the rendered game is output for display.

The game service 230 may be provided by a data center that uses a combination of non-multimode gaming servers and multimode gaming servers to execute the games and render a video game image. In one aspect, the non-multimode gaming servers may be included to match the minimum or base gaming demand. The non-multimode gaming servers may not include software to render videos in various formats. On the other hand, the multimode gaming servers may include software to encode video into one or more formats.

Exemplary Game Service

Figure 3:
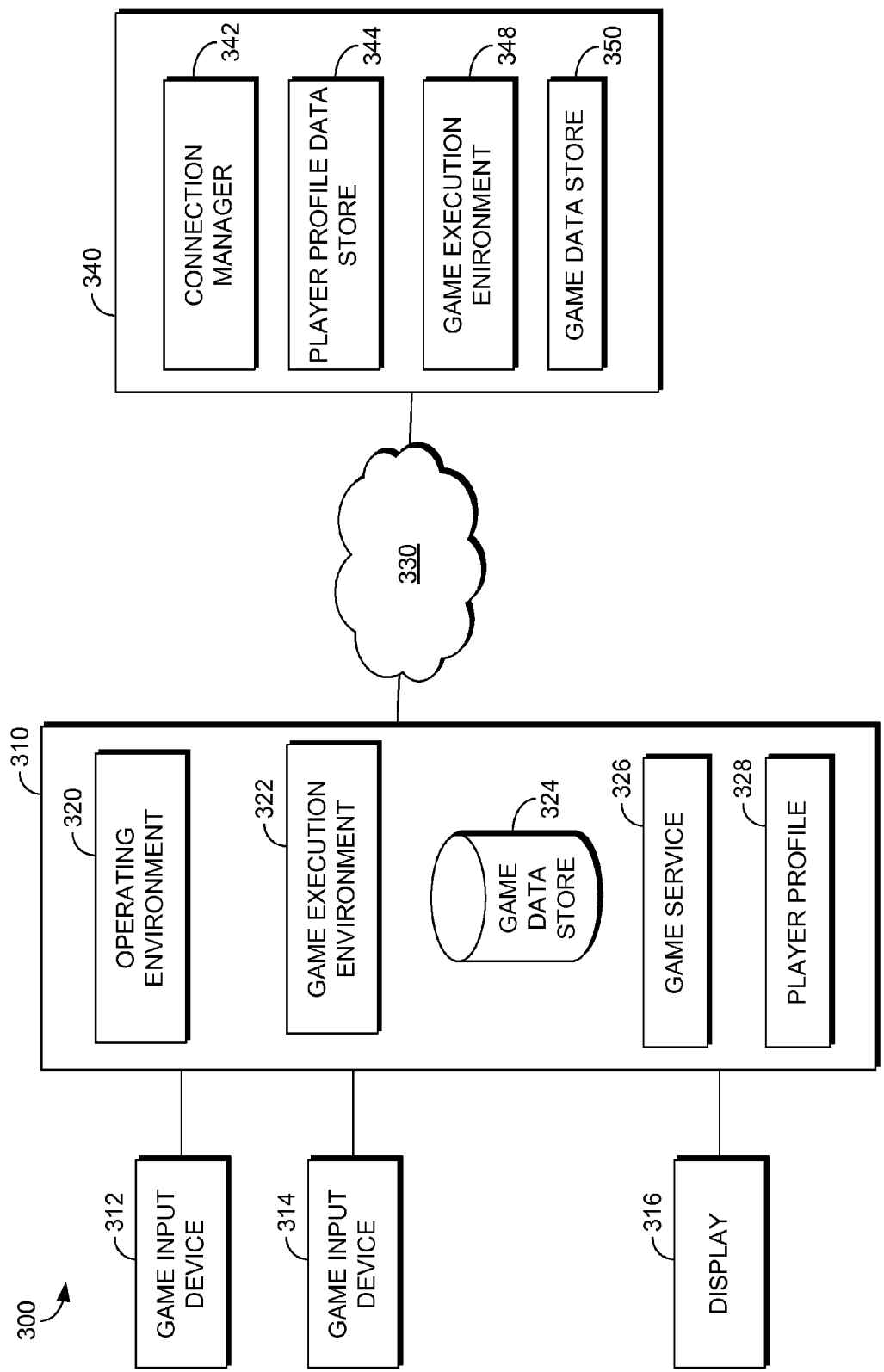
FIG. 3 is a diagram depicting a remote gaming environment having one or more data centers with multimode gaming servers, in accordance with an aspect of the present invention.

Turning now to FIG. 3, an exemplary remote gaming environment 300 is shown, in accordance with an aspect of the present invention. The gaming environment 300 includes a game client 310 that is shown communicatively coupled to a game service 340 through a network 330. The gaming service may use one or more multimode gaming servers to accommodate peak gaming demand.

In one aspect, the network may be the Internet. The devices in FIG. 3 and programs running on the devices may communicate with each other using one or more communication protocols including: hypertext transfer protocol (HTTP), real-time transport protocol (RTP), real time streaming protocol (RTSP), real time messaging protocol (RTMP), simple object access protocol (SOAP), representational state transfer (REST), user datagram protocol (UDP), and/or transmission control protocol (TCP).

The game client 310 is connected to a first game input device 312, a second game input device 314, and a display 316. Exemplary game input devices include game pads, keyboards, a mouse, a touch pad, a touch screen, a microphone for receiving voice commands, a depth camera, a video camera, a keyboard, and a trackball. Aspects of the present invention are not limited to these input devices. The display device 316 is capable of displaying video game content. For example, the display 316 may be a television or computer screen. In another aspect, the display 316 is a touch screen integrated with the game client 310.

The game client 310 is a computing device that is able to execute video games. The game client 310 could be a tablet or a laptop computer. In another aspect, the game client 310 is a game console and the display 316 is a remote display communicatively coupled to the game console. The game client 310 includes an operating environment 320, a game execution environment 322, a game data store 324, a game service client 326, and a player profile data store 328.

The operating environment 320 may be provided by an operating system that manages the hardware and provides services to application running on the game client 310. The operating environment may allocate client resources to different applications as part of the game migration. For example, the operating environment may give control of the display to the game execution environment 322 once game play is migrated to the game client 310.

The game execution environment 322 comprises the gaming resources on the client 310 required to execute instances of a game or a game preview. The game execution environment 322 comprises active memory along with computing and video processing. The game execution environment 322 receives gaming controls and causes the game to be manipulated and progressed according to its programming. In one aspect, the game execution environment 322 outputs a rendered video stream that is communicated to the display 316.

The game data store 324 stores downloaded games, game previews, and partially downloaded games.

The game service client 326 is a client application that displays rendered video game images received from the game service 340. The game service client 326 may also process game input and change it into an easily uploadable format that is communicated to the game service 340. The game service client 326 may also scale the rendered video game images received from the service 340 to a size optimized for display 316.

The player profile data store 328 stores player profile information for individual games. The player profile information may also save tombstones or game-saved data for individual games, including previews. Both the game-save file and the tombstone record game progress. The game execution environment 322 then reads the game-saved data to start the game where the player left off on the server. The opposite scenario is also possible where the game-saved data and player profile information is uploaded from the game client 310 to the game service 340 to initiate the game.

The game service 340 comprises a connection manager 342, a player profile data store 344, a game execution environment 348, and a game data store 350. Though depicted as a single box, the game service 340 could be implemented in a data center that comprises numerous machines, including multimode gaming servers, or even several data centers.

The connection manager 342 builds a connection between the client 310 and the service 340. The connection manager 342 may also provide various authentication mechanisms to make sure that the user is authorized to access the game service 340. The connection manager 342 may also analyze the bandwidth available within a connection and throttle the download of a game during game play to make sure that game play is not degraded.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. As a player progresses through a game or game preview, the player's score and access to game levels may be stored. Further, the player profile data store 344 may store information about individual player preferences such as language preferences. Information regarding a player's game client and speed of the network connection may also be stored and utilized to optimize the gaming experience. For example, in one aspect, when a geographically proximate data center is busy, players with higher latency Internet connections may be preferentially connected to proximate data centers while players with lower latency connections may be connected to data centers that are further away. In this way, the players with the network connections that are best able to handle the additional latency are connected to data centers that create additional latency because of their location.

The player profile data store 344 may also store a usage history for the individual player. A player's history of purchasing games, sampling games, or playing games through a game service that does not require the purchase of the games may be stored. The usage information may be analyzed to suggest games of interest to an individual player. In one aspect, the purchase history may include games that are not purchased through the game service. For example, the purchase history may be augmented by the player entering in a key from a game purchased in a retail store. In some aspects, the player may then have access to that game both on their game client 310 and through the game service when they are no longer at their game client.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls through an I/O channel and causes the game to be manipulated and progressed according to its programming. In one aspect, the game execution environment 348 outputs a rendered video stream that is communicated to the game client. In other aspects, the game execution environment 348 outputs game geometry, or other representations, which may be combined with local objects on the gaming client to render the gaming video.

The game data store 350 stores available games. The games may be retrieved from the data store and activated through an active memory. The game data store 350 may be described as passive or secondary memory. In general, games may not be played off of the game data store 350. However, in some aspects, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

Figure 4:
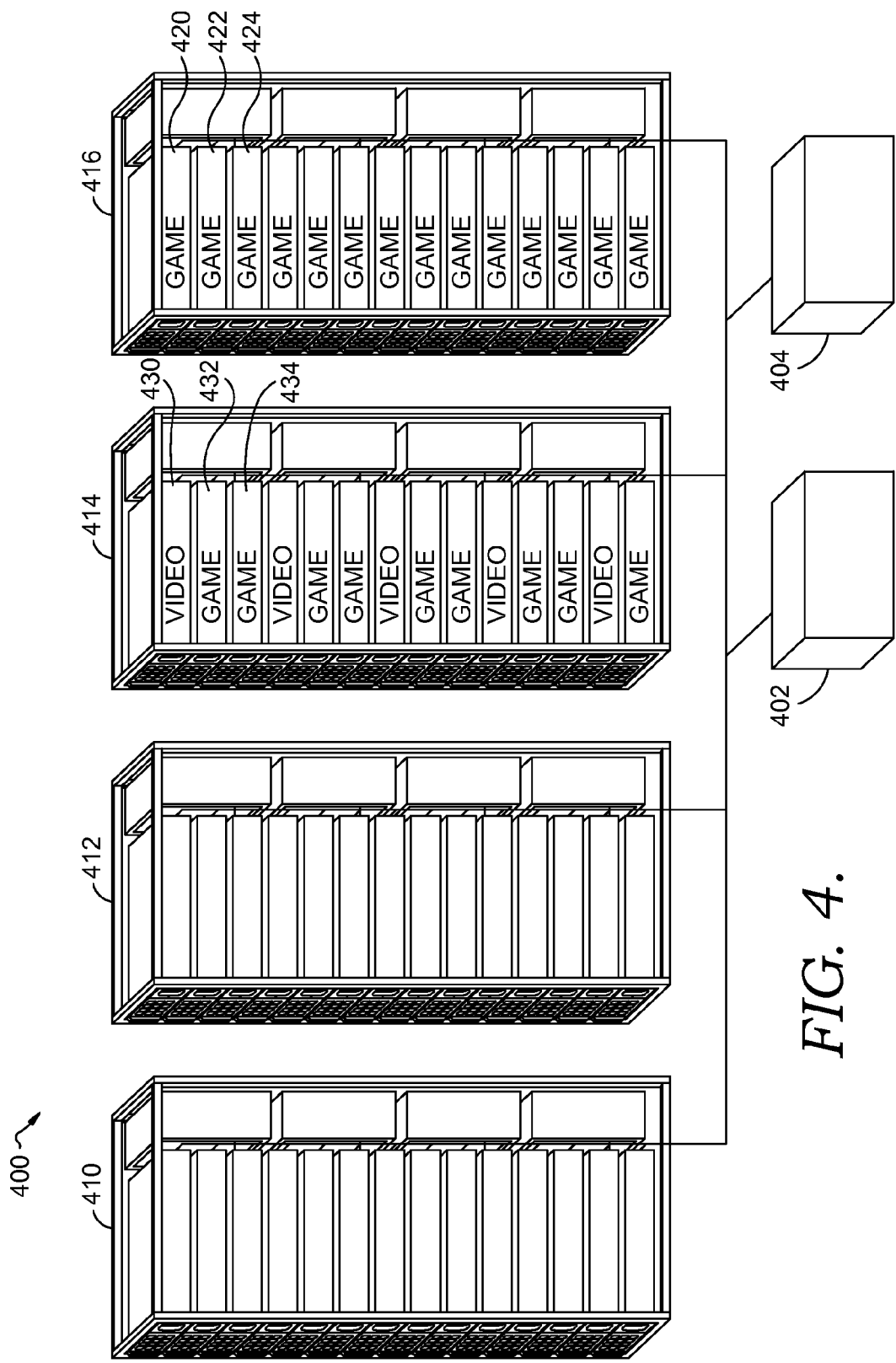
FIG. 4 is a diagram depicting an arrangement of multimode gaming servers in various modes, in accordance with an aspect of the present invention.

Turning now to FIG. 4, an arrangement of multimode gaming servers within a data center 400 is shown, in accordance with an aspect of the present invention. The arrangement comprises rack 410, rack 412, rack 414, and rack 416. Four racks are shown for the sake of simplicity; an actual implementation could include tens, hundreds, or thousands of racks deployed within a data center. Each rack can comprise a quantity of servers, power distribution equipment, and networking equipment. In one arrangement, a networking cable is run to a router/switch within the rack. Each server in the rack then connects to the router. Similarly, power may be run to a power distribution station associated with the rack. Each server is then coupled to the power distribution station.

Additionally, each rack can include cooling equipment, such as fans. In one arrangement, a fan wall is provided behind the servers to draw air through the servers. The fan wall may have rows of fans with each row serving a group of servers. In a vertical cooling arrangement, one or more fans are located above or below the rack to facilitate airflow to the servers within the rack. The cooling equipment can also include thermocouples and other sensors that measure temperature, pressure, and airflow throughout the rack. The rack may include one or more fixed or adjustable baffles to distribute air where needed for cooling.

A control fabric 402, alternatively described as a data center controller, is communicatively coupled to the racks and multimode gaming servers within the racks. The control fabric 402 manages the state of each multimode gaming server. For example, the control fabric 402 can transition a multimode gaming server between game mode and video encode mode. The control fabric 402 can distribute workloads to computing devices including starting game sessions and video encode jobs. The control fabric 402 can also manage cooling equipment within the racks. For example, the control fabric 402 can lower fan speed within a rack when the servers within the rack are in a low-power mode.

The video encode job manager 404 accumulates and distributes video encode jobs. In one aspect, the job manager 404 receives video encode jobs that require a single video to be encoded in a plurality of different video formats. Exemplary formats include: Moving Pictures Experts Group (MPEG), H.261, H.262, H.263, H.264, and H.265 encoders, SMPTE ("Society of Motion Picture and Television Engineers") 421M, informally known as VC-1, and Dirac or VC-2.

The control fabric 402 analyzes the usage data to determine, among other things, how many standby instances of a particular game title should be available and how many gaming servers should be in game mode to accommodate the standby instances. In general, games with a high demand will have more standby instances of a game available. Loading a game into active memory to create a standby instance may take a minute or two; thus, games with high churn in and out may also require more standby instances of games to be available. The time it takes to create a standby instance of a particular game title also should be considered. Games that load comparatively quickly may require less standby instances because additional game instances can be generated more quickly as demand changes. In other words, games with a slower load time may require more available standby games. The number of game instances handled by each gaming server is also a factor. In one aspect, an individual gaming server can generate two game instances. The game instances may be multiplayer instances.

The control fabric 402 may also allocate gaming server resources to a particular game pool. Server resources allocated to a particular game pool include the resources needed to execute the active game instances as well as the standby game instances that have no player connected. As demand for various games changes over time, the allocation of resources to game pools can be adjusted. Further, historical usage data may be utilized to anticipate changes. For example, if a first game is played more heavily between 10:00 p.m. and midnight than a second game that is played more heavily during the day, then resources may be switched between the second and first game for the 10:00 p.m.-to-midnight period.

Different gaming servers in a data center may have different video encoding software installed. For example, each gaming server may be able to encode video in only one or two different formats. The distribution of encoding software within the data center may evenly distribute the most commonly used encoding formats. The even distribution of encoding software avoids "hot spots" within the data center. A hot spot is a cluster of servers running when other groups of servers are not running or are running at lower power levels. Avoiding hot spots can reduce the amount of cooling needed for a data center, or a portion of a data center.

Network resources may also be managed by the control fabric 402 to facilitate communications between the client devices and the game session. Thus, as additional computing devices are allocated to a game service, the network resources may be updated to route communications appropriately to the computing devices on which the game service is running.

Racks 414 and 416 illustrate multimode gaming servers in a mixture of modes. Aspects of the present invention are not limited to mixing modes within a data center unit, such as a rack chassis. In one aspect, all multimode gaming servers within a data center unit are operating in the same mode as with rack 416. As FIG. 4 illustrates, a mixture of modes within a rack is also possible as with rack 414.

Illustratively, rack 416 includes multimode gaming server 420 in game mode, multimode gaming server 422 in game mode, and multimode gaming server 424 in game mode. Notice that all of the gaming servers in the rack 416 are in game mode.

Illustratively, rack 414 includes multimode gaming server 430 in video encode mode, multimode gaming server 432 in game mode, and multimode gaming server 434 in game mode. Notice that approximately one out of three gaming servers are in video encode mode with the rest in game mode. Further, the gaming servers in video encode mode are evenly distributed throughout the rack 414. Every other server, every third server, or every N server, where N is an integer, are examples of evenly distributing server modes throughout a data center unit. In one aspect, the computing devices within a rack have a homogeneous hardware configuration that allows them to switch between a gaming optimized mode and a non-gaming optimized mode.

The multimode gaming servers can be transitioned between a gaming optimization and video encode mode. In one aspect, the data center can include a mixture of single mode servers. The quantity of single mode servers may be specified to accommodate base demand for the computing service provided by an optimized server. The deployment of single mode servers to meet base demand allows the single mode servers to be active above a threshold amount of time on average. For example, an amount of single mode servers deployed may be limited to those able to be active, on average, 80% of a day. Multimode gaming servers can be used during peak usage periods to accommodate game demand in combination with single mode servers optimized for the work load, such as gaming. During off-peak hours, the gaming servers can be transitioned to video encode mode.

Figure 5:
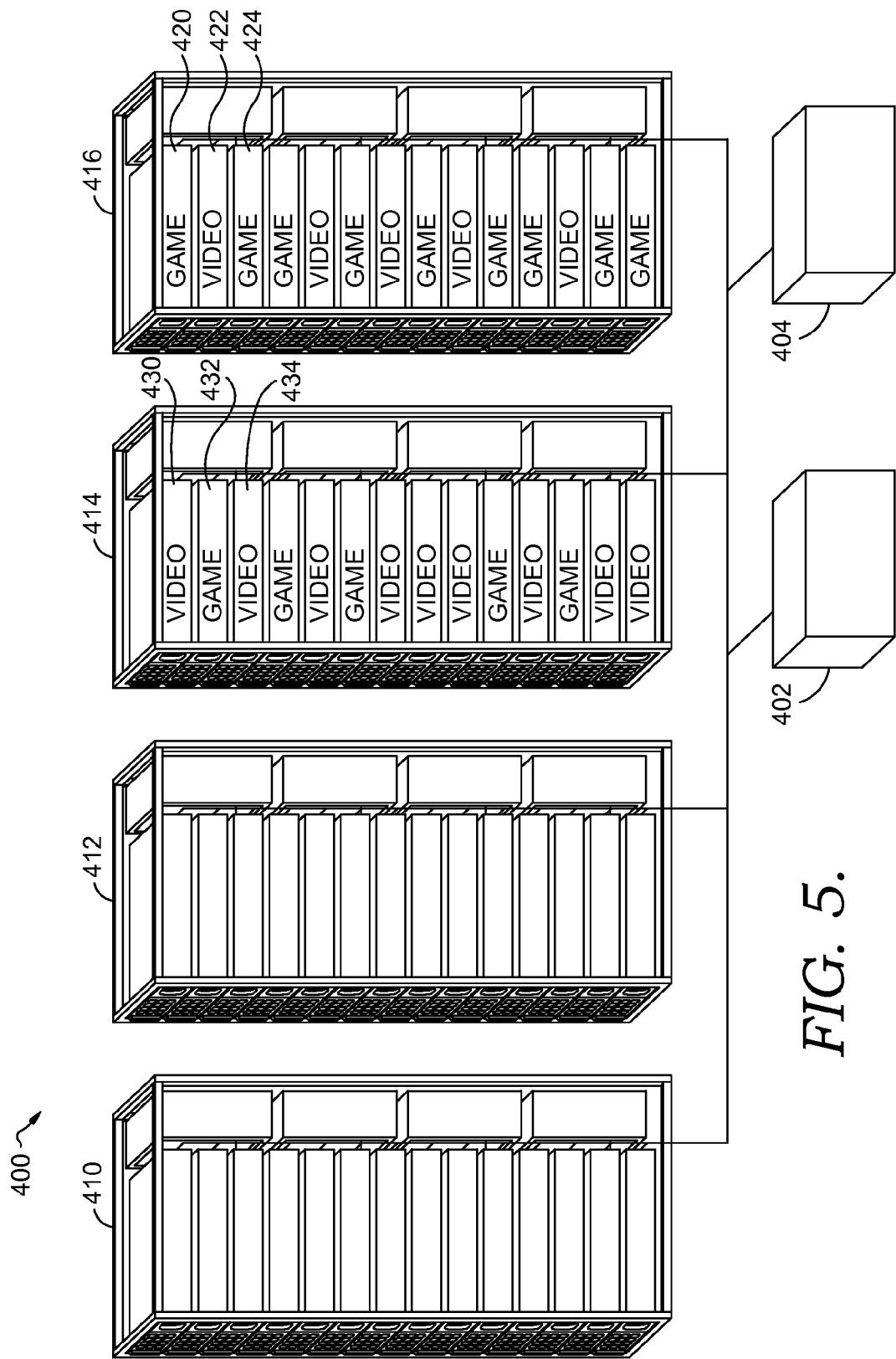
FIG. 5 is a diagram depicting an arrangement of multimode gaming servers in various modes, in accordance with an aspect of the present invention.

Turning now to FIG. 5, an arrangement of multimode gaming servers within a data center 400 is shown, in accordance with an aspect of the present invention. The hardware components in FIG. 5 have been described previously with reference to FIG. 4. FIG. 5, when compared to FIG. 4, illustrates a transition of gaming servers from game mode to video encode mode during off-peak gaming usage.

Illustratively, rack 416 includes multimode gaming server 420 in game mode, multimode gaming server 422 in video encode mode, and multimode gaming server 424 in game mode. Notice that the gaming servers in video encode mode are evenly distributed through rack 416.

Illustratively, rack 414 includes multimode gaming server 430 in video encode mode, multimode gaming server 432 in game mode, and multimode gaming server 434 in video encode mode. Notice that approximately two out of three gaming servers are in video encode mode with the rest in game mode. Further, the gaming servers in video encode mode are evenly distributed throughout the rack 414.

Figure 6:
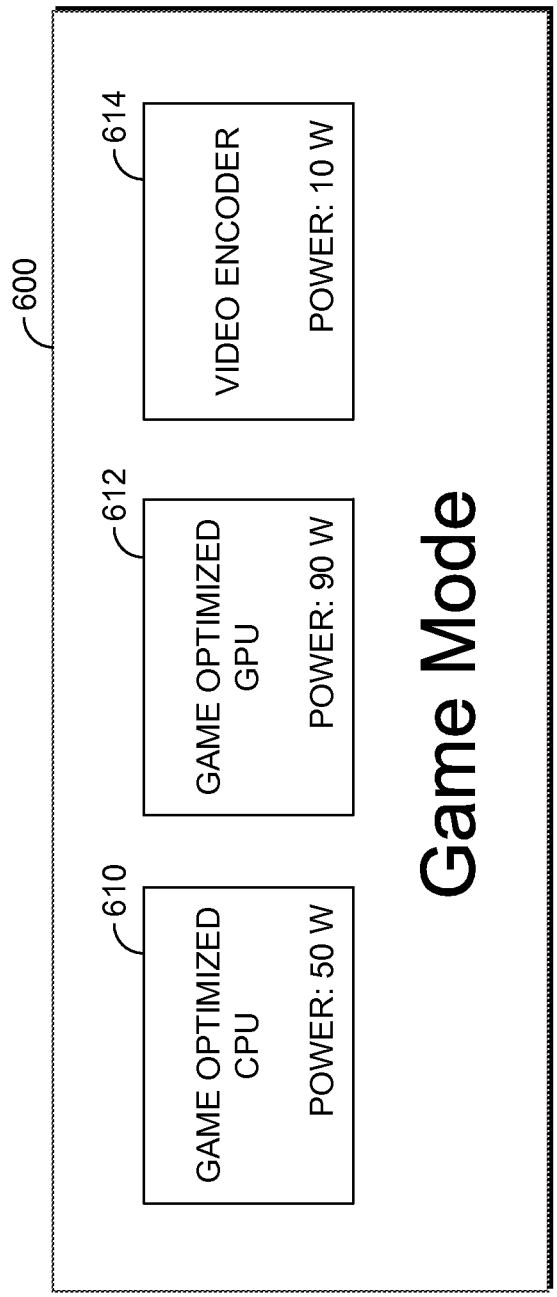
FIG. 6 is a diagram depicting a motherboard showing power usage with active gaming resources, in accordance with an aspect of the present invention.

Turning now to FIG. 6, different types of resources within a gaming server are shown along with its respective power usage in game mode, in accordance with an aspect of the present invention. The multipurpose server includes motherboard 600. The motherboard 600 comprises a game-optimized CPU 610, a game-optimized GPU 612, and a video encoder 614. Also, though not shown, the motherboard 600 includes memory and other components that support the gaming server operations. For example, a CPU can have dedicated DRAM.

In one aspect, the game-optimized CPU 610 and game-optimized GPU 612 are the same chips as found in a commercially available game console. Exemplary game consoles include the Xbox 360, Sony's PlayStation® family, Xbox One, and Nintendo's Wii™, and such. The gaming server's hardware configuration, including use of identical chip sets, can be configured to allow games written for a commercially available game console to run on the multimode gaming server without modification to the game code. No modifications to the game code are needed when the game code interacts with the hardware in the same way the games interact with hardware in the game console. For example, a process performed by a game console's GPU can be performed by the game server's GPU to produce the same result.

In game mode, as shown in FIG. 6, the game-optimized CPU 610 is drawing 50 W. In contrast, the game-optimized GPU 612 is drawing 90 W and the video encoder 514 is drawing 10 W for a total use of 150 W in game mode.

Figure 7:
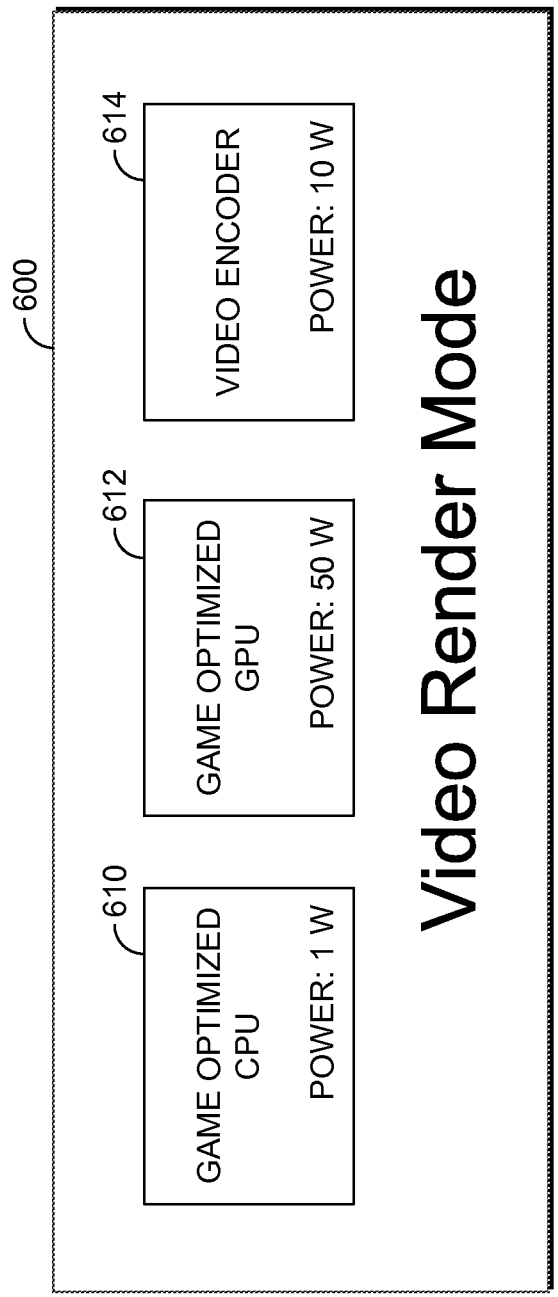
FIG. 7 is a diagram depicting a motherboard showing power usage with active video render resources, in accordance with an aspect of the present invention.

Turning now to FIG. 7, power use in video render mode is illustrated, in accordance with an aspect of the present invention. In video render mode, the game-optimized CPU 610 is drawing only 1 W, the game-optimized GPU 612 is drawing 50 W, and a video encoder 614 is drawing 10 W for a total of 61 W. When compared to the game mode, video encoding is less CPU intensive and also less GPU intensive.

Because power usage and heat generation are correlated, the gaming sever will produce less heat when in video render mode.

Figure 8:
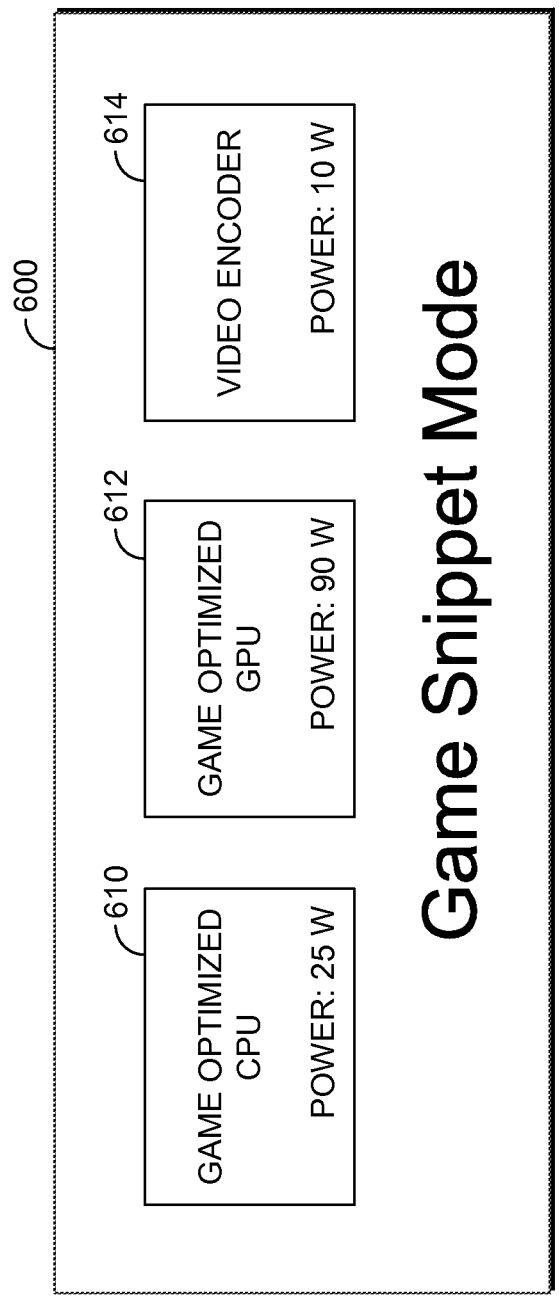
FIG. 8 is a diagram depicting a motherboard showing power usage with active game snippet mode, in accordance with an aspect of the present invention.

Turning now to FIG. 8, power use in game snippet mode is illustrated, in accordance with an aspect of the present invention. Game snippet mode is a special type of video rendering mode. Game snippets are videos of a user playing a video game. Game snippets are sometimes described as brag videos. For example, the snippet may be a 30 second recording of the player using a spoon to kill the evil wizard. The user can record, play, and share videos of achievements with friends. In one aspect, the user can request higher quality videos than produced by the video game's native resolution.

These requests can be batched and then video encoded using the gaming servers during off-peak gaming hours. In one aspect, the game geometry is part of the request along with game state information for the portion of play used to form the snippet. As used herein, game geometry is the description of the game world's appearance, including location, movement, and appearance of players in the world. In this case, the game server executes the video game using the recorded geometry and game code on the gaming server to generate a game snippet having a higher resolution. This process is less CPU intensive than playing an actual game because the geometry does not need to be generated.

In game snippet mode, the game-optimized CPU 610 is drawing 25 W, the game-optimized GPU 612 is drawing 90 W, and a video encoder 614 is drawing 10 W, for a total of 125 W. When compared to the game mode, game snippet mode is less CPU intensive and also less GPU intensive. Because power usage and heat generation are correlated, the gaming sever will produce less heat when in game snippet mode than when in game mode. In contrast, the gaming server will produce more heat when in game snippet mode than when in video render mode.

Figure 9:
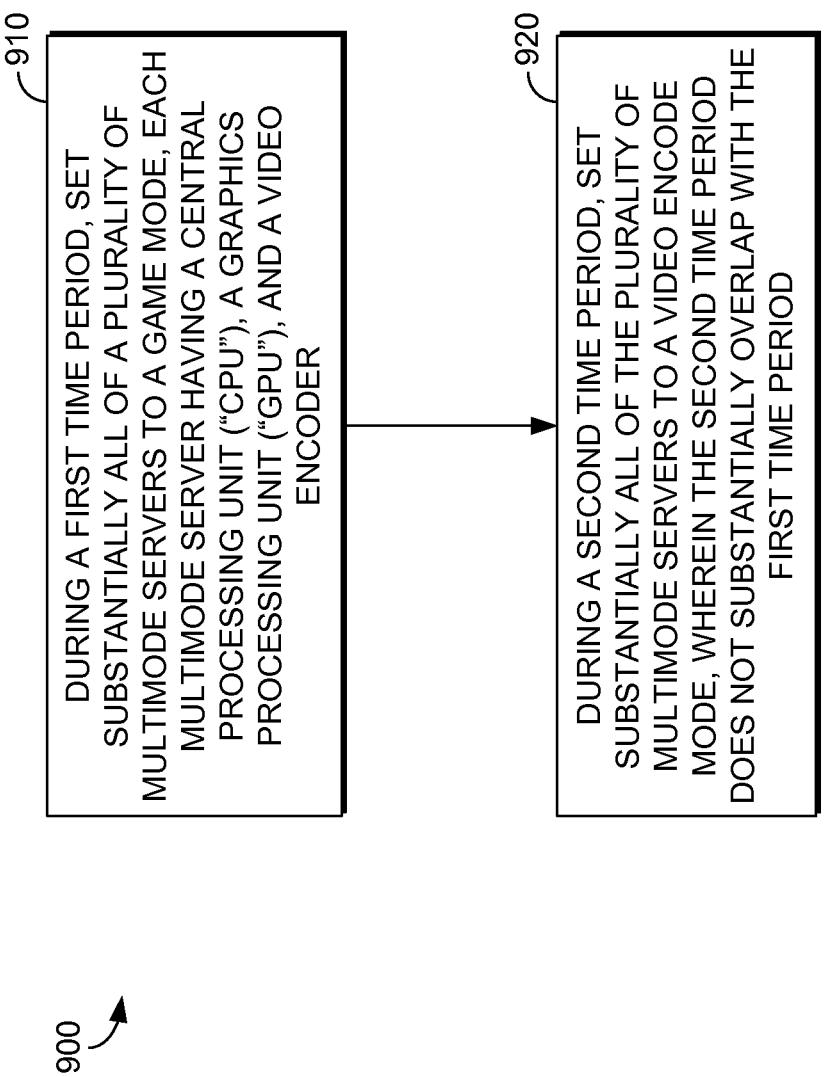
FIG. 9 is a diagram depicting a method for managing workloads within a data center, in accordance with an aspect of the present invention.

Turning now to FIG. 9, a method 900 of managing multimode gaming servers within a data center is described, in accordance with an aspect of the present invention. In one aspect, method 900 is performed by a data center controller, such as data center controller 402 described previously. The multimode gaming servers have a central processing unit ("CPU"), a graphics processing unit ("GPU"), and a video encoder. Further, the gaming servers comprise software that enables the gaming sever to execute a video game and produce a rendered video stream of the video game for communication to a client device. Thus, a general-purpose server would not be a "gaming server." Further, a server that does not produce a rendered video game image for the client is not a gaming server as used herein.

At step 910, more than 50% of a plurality of multimode gaming servers are set in game mode. For example, 60% or more, such as 80% or 100%, of the multimode gaming servers can be set to game mode. In one aspect, 100% of the multimode gaming servers are set to game mode to accommodate peak demand.

At step 920, demand for gaming in a data center unit comprising the plurality of multimode gaming servers is monitored. Aspects of the present invention monitor, forecast demand, and dynamically manage server mode within a remote game service to accommodate demand. The game service provides a remote gaming environment to which users connect over a wide area network, such as the Internet. For example, the game service could utilize a series of servers, or a series of data centers, located throughout the world to host video games. Players then connect to the gaming service using a variety of different client devices including game consoles, smartphones, tablets, personal computers, and other computing devices.

Aspects of the present invention monitor characteristics of game play to determine whether gaming servers should be transitioned to or out of game mode. Aspects of the invention may monitor game instances by game title. For example, aspects of the invention may forecast that demand for a specific game title within a data center is 400 game instances. In one aspect, a gaming server is preloaded with a single game title or only a few game titles. In this case, gaming servers may be transitioned out of game mode as demand wanes for the game or games the game server is set up to run.

The demand forecast is used to determine peak demand for a game, time of day for peak demand, and to determine a threshold rate of requests for the game that indicates the peak demand has passed. Games with higher demand may have more standby game instances ready for players to drop in. Games with less demand may have fewer active game instances running waiting for players to drop in. The number of standby instances of various games may be different based on the location of a particular server and the players serviced by the server.

In a standby state, the game objects in active memory are accessible and manipulable by the game server that executes the game. Active memory contrasts with secondary memory in which game objects may be stored passively while they are not manipulable in a game action. The standby game instances running in active memory are not attached to a player profile or an I/O channel from a game client. Once the player requests a game, the player's player profile can be loaded into the running game instance and an I/O channel is mapped from the game client to the game instance. Thus, the standby game instance may be running without a player profile or an I/O channel. Once the player or players are added to the standby instance, the game instance becomes an active instance.

Various characteristics of the game service may be monitored and used to forecast demand and determine an optimum number of game instances to have in standby. For example, the number of active game sessions running for a title is monitored, along with requests for new games sessions and the time it takes to generate a new game session for the game title. These characteristics may be used to calculate the optimum number of gaming servers in game mode needed to meet demand as the number of game sessions increases or decreases.

At step 930, a determination is made that demand for gaming has fallen below a threshold by analyzing a rate of requests for new game sessions. A request for a new game session can be a request for a user to play a game title through the game service. Both the absolute rate of requests and a change in the request rate can be analyzed. For example, the threshold could be less than 5 requests per minute and a decrease in rate, such as 1 less request per minute. The rate could be calculated as a rolling average to even out temporary rate spikes.

As mentioned, the threshold rate may be calculated based on an analysis of historical usage. The threshold rate can reflect a confidence factor, such as 90% probability, that a gaming server will not need to be transitioned back to game mode to accommodate demand for a game within the next twelve hours.

At step 940, upon said determination, a subset of the plurality of multimode gaming servers are transitioned from a game mode to a video render mode. The gaming servers may be transitioned from game mode to video encode mode by communicating an instruction to the gaming server. In response to the instruction, the gaming server may remove gaming functions, including game code for a video game title, from active memory. The gaming server may then load software necessary to perform video encoding and manage video encoding jobs into active memory.

The gaming servers in the subset may be selected to evenly distribute servers in game mode with servers in video encode mode. As mentioned, servers in video encode mode may generate less heat than servers in game mode. Evenly distributing the servers may allow for the cooling throughout the data center to be reduced, thereby saving energy. Unequal distribution may require the cooling to maintain a high level to accommodate the hottest parts of the data center. When the cooling can be provided on a granular level to portions of a data center, then the even distribution may occur within a portion of the data center.

At step 950, a video render job is assigned to a multimode game server in the subset. In one aspect, the video render job is a game snippet. As mentioned, a game snippet may be a "recording" or representation of a video game played by a user. In one aspect, the game snippet is rendered by executing game code on the multimode gaming server to regenerate a video image of recorded game action and then encoding the video image. The game snippet generated by this method will duplicate the visual output experienced by the user during gameplay, except that it will be in an improved resolution and/or different format.

In one aspect, the video render job is received from a video game console located apart from a data center where the subset of the plurality of multimode gaming servers is located. For example, a player using a video game console to play a game provided by a gaming server in the data center may request a game snippet. This request may be stored by the data center fabric or video encode manager until gaming servers become available to transition into video encode mode. As gaming servers become available for video encoding, the job can be communicated to the available gaming server. In one aspect, the request may be sent directly from a gaming server in any mode to a gaming server in video encode mode.

Figure 10:
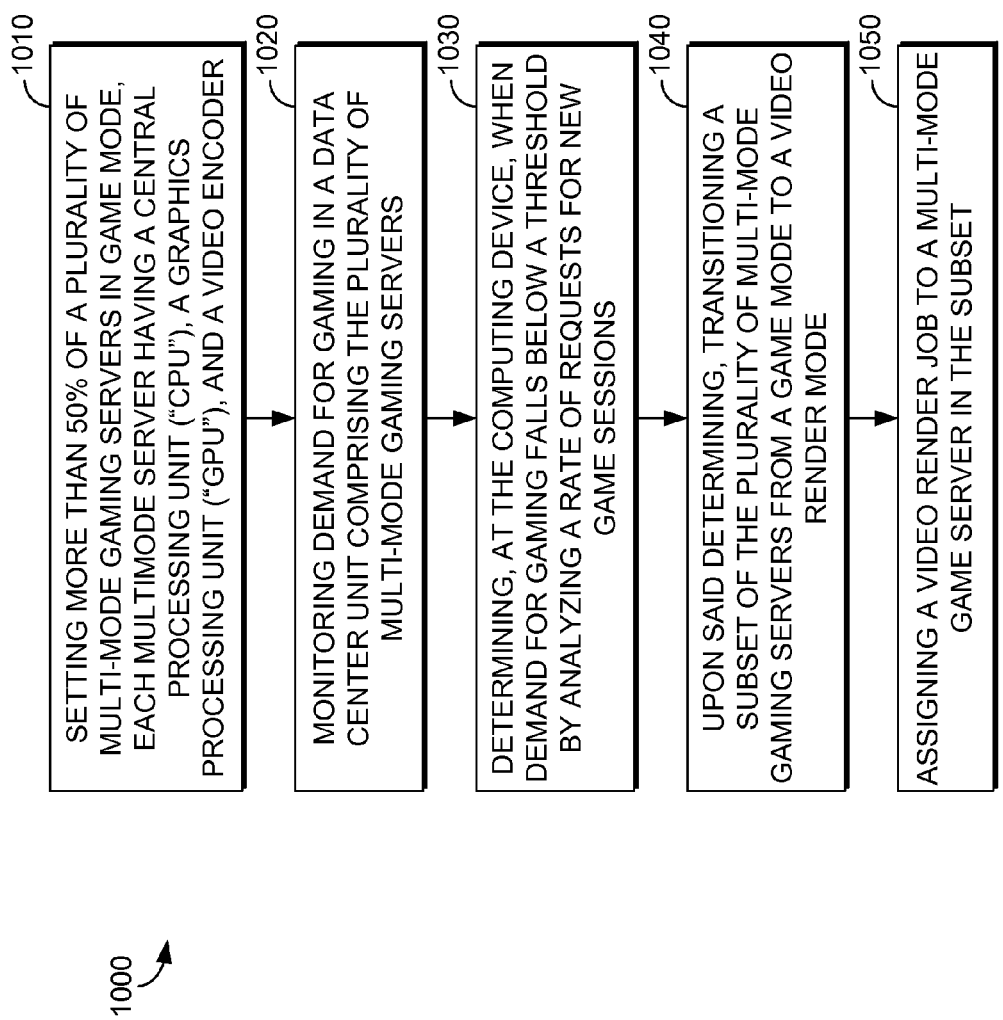
FIG. 10 is a diagram depicting a method of managing multimode gaming servers within a data center, in accordance with an aspect of the present invention.

Turning now to FIG. 10, a method 1000 for managing workloads within a data center is provided, in accordance with an aspect of the present invention. Method 1000 may be performed by a data center controller. At step 1010, during a first time period, substantially all of a plurality of multimode gaming servers in a data center are set to a game mode. The multimode gaming server has a central processing unit ("CPU"), a graphics processing unit ("GPU"), and a video encoder.

At step 1020, during a second time period, at least 50% of the plurality of multimode gaming servers are set to a video encode mode. The second time period does not substantially overlap with the first time period. The first and second time periods may be calculated based on historical demand for gaming, as described previously.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media storing computer-executable instructions that, when executed by a computing device having a processor, cause the computing device to manage multimode gaming servers within a data center, the instruction causing the computing device to:
   set more than 50% of a plurality of multimode gaming servers in a game mode, each multimode gaming server having a central processing unit ("CPU"), a graphics processing unit ("GPU"), and a video encoder;
   monitor demand for gaming in a data center unit comprising the plurality of multimode gaming servers;
   determine, at the computing device, when demand for gaming falls below a threshold by analyzing a rate of requests for new game sessions;
   upon said determining, transition a subset of the plurality of multimode gaming servers from the game mode to a video render mode; and
   assign a video render job to a multimode game server in the subset of the plurality of multimode gaming servers.

2. The media of claim 1, wherein the video render job is a game snippet.

3. The media of claim 2, wherein the game snippet is rendered by executing game code on the multimode gaming server to regenerate a video image of recorded game action and then encoding the video image.

4. The media of claim 2, wherein the instructions further cause the computing device to receive the video render job from a video game console located apart from the data center where the subset of the plurality of multimode gaming servers is located.

5. The media of claim 2, wherein the instructions further cause the computing device to receive the video render job from a multimode gaming server running in the game mode.

6. The media of claim 1, wherein the instructions further cause the computing device to select individual servers within the subset of the plurality of multimode gaming servers to generate an even distribution of multimode gaming servers in the game mode and the video encode mode within the data center unit.

7. The media of claim 1, wherein a group of multimode gaming servers within the data center unit are cooled by a row of fans on a fan wall.

8. A method for managing workloads within a data center, the method comprising:
   during a first time period, setting substantially all of a plurality of multimode gaming servers in the data center to a game mode, each multimode gaming server having a central processing unit ("CPU"), a graphics processing unit ("GPU"), and a video encoder;
   determining when demand for gaming falls below a threshold by analyzing a rate of requests for new game sessions; and
   upon said determining, during a second time period, setting at least 50% of the plurality of multimode gaming servers to a video encode mode,
   the second time period not substantially overlapping with the first time period.

9. The method of claim 8, further comprising receiving a video encode project during the first time period and storing the video encode project for encoding during the first time period.

10. The method of claim 9, wherein the video encode project is a game snippet to be encoded in a higher resolution than a resolution rendered during gameplay.

11. The method of claim 8,
   wherein the determining comprises analyzing an amount of requests for new game sessions received to determine when a rate of requests per period of time falls below a threshold determined using historical gameplay data.

12. The method of claim 11, wherein the method further comprises selecting the at least 50% of the plurality of multimode gaming servers to generate an even distribution of multimode gaming server in the game mode and the video encode mode within a data center unit.

13. The method of claim 12, wherein the data center unit is a data center rack.

14. The method of claim 8, further comprising communicating a rendered video game image over a wide area network to a remotely located device, the rendered video game image generated by a multimode gaming server operating in the game mode.

15. A data center comprising:
a plurality of multimode gaming servers comprising a central processing unit ("CPU"), a graphics processing unit ("GPU"), and a video encoder; and
a control fabric that manages a demand for remote gaming by:
determining when demand for remote gaming falls below a threshold by analyzing a rate of requests for new game sessions; and
upon said determining, transitioning a subset of the plurality of multimode gaming servers from a game mode to a video encode mode, an individual gaming server generating less heat when in the video encode mode than when in the game mode, and when in the game mode the individual gaming server executing code for a game to generate a rendered video game image that is communicated from the data center to a remote computing device.

16. The data center of claim 15, wherein the demand for the gaming severs peaks between 3:00 p.m. and 11:00 p.m. at a data center's location.

17. The data center of claim 15, wherein the data center further comprises a video encode job manager that receives a video encode job and assigns the video encode job to a multimode gaming server after the multimode gaming server has been placed into video render mode.

18. The data center of claim 15, wherein the GPU uses between 40% and 60% of a total electricity consumed by the individual gaming server when in the game mode.

19. The data center of claim 15, wherein the GPU uses between 70% and 90% of a total electricity consumed by the individual gaming server when in the video encode mode.

20. The data center of claim 15, wherein the multimode gaming server comprises a CPU that is also used in a commercially available game console and a GPU that is also used in the commercially available game console, thereby enabling the gaming sever to execute video game code written for the commercially available game console.

* * * * *